J. H. BOWLES.
COLLAPSIBLE TIRE RIM.
APPLICATION FILED SEPT. 3, 1921.

1,424,073.

Patented July 25, 1922.

Inventor:
John H. Bowles.

Watson E. Coleman
Attorney.

UNITED STATES PATENT OFFICE.

JOHN H. BOWLES, OF NEW YORK, N. Y.

COLLAPSIBLE TIRE RIM.

1,424,073.  Specification of Letters Patent.  Patented July 25, 1922.

Application filed September 3, 1921. Serial No. 498,221.

*To all whom it may concern:*

Be it known that I, JOHN H. BOWLES, a citizen of the United States, residing at New York city, in the county of New York and State of New York, have invented certain new and useful Improvements in Collapsible Tire Rims, of which the following is a specification, reference being had to the accompanying drawings.

This invention relates to collapsible rims for automobile tires, and particularly to that type of rim wherein the rim is formed in two or more sections, the rim being capable of being broken at the joint between the two sections so as to permit the expansion of the rim or the contraction of the rim.

The general object of my invention is to provide a construction of this character which is adapted for use with either clincher or straight-sided tires.

A further object is to provide a device of this character which will do away with the necessity of using tire irons, thereby saving time and labor in changing a tire.

And a further object is to provide a device of this character by which the rim may be very quickly contracted or expanded, and which will be locked in its contracted position.

Other objects will appear in the course of the following description.

My invention is illustrated in the accompanying drawings, wherein:—

Figure 1:
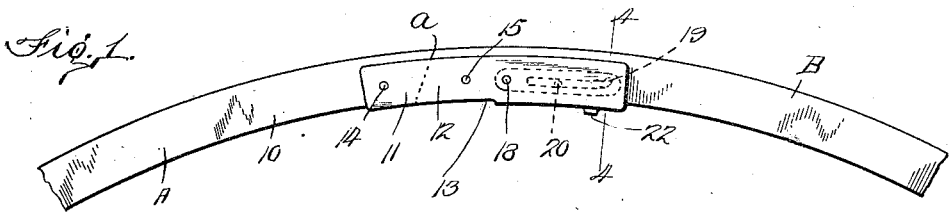
Figure 1 is a fragmentary side elevation of a contractible wheel rim constructed in accordance with my invention.

Referring to these drawings, 10 designates the rim of an automobile wheel which may be of any suitable or usual construction. This rim may be formed in one section split or disconnected at the points *a*, or it may be formed in a plurality of sections. The rim is preferably trough-shaped to receive the tire. Connecting the end portions A and B of the rim is my improved attachment, which comprises a trough-shaped body 11 and longitudinally extending ears 12 which form continuations of the side walls of the trough-shaped body, the bottom of the trough being cut away, as at 13, between these ears or sides. The extremities of the ears 12 are pivoted to the side walls of the section A by rivets 14 or in any other suitable manner, and the extremity of the section B is pivoted between said ears by means of rivets or other suitable instrumentalities, designated 15. Thus it will be seen that the sections A and B may be brought into alignment with each other or into off-set relation with each other by shifting the member 11 which constitutes a lever. Pivoted to one or both of the side walls of the body 11 is a link 16 formed with a longitudinally extending slot 17, which at the end remote from the pivot 18 is angularly off-set, as at 19. A headed pin or equivalent element 20 projects from the wall of the section B into said slot.

The inner face of the body 11 is formed with two transversely extending slits 21 which are approximately parallel to each other and the metal 22 between said slits is outwardly forced or pressed so as to provide what constitutes a socket for the reception of the end of a screw-driver or like implement, whereby the body 11 which constitutes a lever may be operated.

Figure 2:
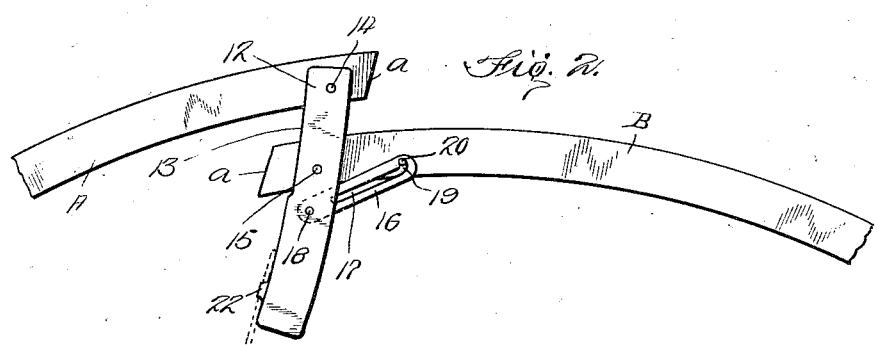
Figure 2 is a like view, but showing the wheel rim in its contracted position.
Figure 3:
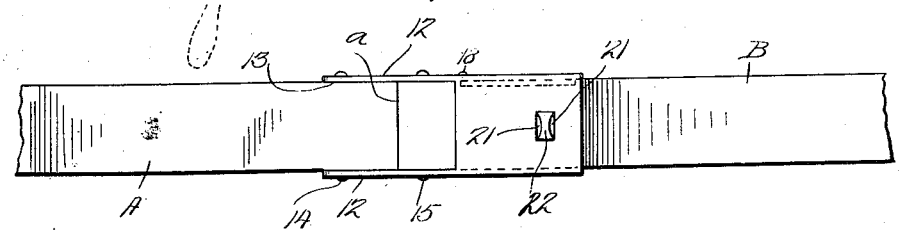
Figure 3 is an under side plan view of the construction as shown in Figure 1.
Figure 4:
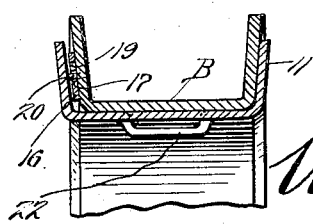
Figure 4 is a section on the line 4—4 of Figure 1.

In the use of this device, the rim is first contracted, as illustrated in Figure 2, and the tire applied over the rim. Then the rim is expanded by inserting a screw-driver or like implement into the socket formed by the slits 21 and the portion 22 and the body 11 is turned upon its pivot 14 so as to force the section B outward and into alignment with the section A. The stud 20 will move down the slot 17 under these circumstances, and when the sections A and B are in alignment with each other, as illustrated in Figure 1, this stud will be disposed in the straight portion of the slot 17 and the link 16 will be in alignment with the body 11. When it is desired to remove the tire or contract the rim, the screw-driver or other member is inserted in the slots 21, and by pressing inward will cause the downward movement of the lever member 11, causing the contraction of the section B. When the member 11 is in a radial position, the stud 20 will drop into the off-set end 19 of the slot 17 and the link 16 will drop by gravity into its locking position which will lock the rim in its contracted condition so as to permit a person to slip on or take off the tire with relatively little labor and without having to force the rim section B inward against its own elasticity as the rim section will be locked in its contracted position.

I claim:—

1. A tire rim split at one point, the tire rim being trough-shaped in cross section, a lever trough-shaped in cross section and having longitudinally extending ears pivoted to one of the sections of the rim at their extremities and pivoted intermediate their extremities to the other section of the rim, whereby upon an oscillation of the lever the rim sections may be shifted into or out of alignment with each other, a socket formed in that end of the lever remote from its pivotal connection to the first named section, and means for locking the lever in a radial position with the rim sections in off-set relation to each other.

2. A tire rim split at one point, the tire rim being trough-shaped in cross section, a lever trough-shaped in cross section and having longitudinally extending ears pivoted to one of the sections of the rim at their extremities and pivoted intermediate their extremities to the other section of the rim, whereby upon an oscillation of the lever the rim sections may be shifted into or out of alignment with each other, a socket formed in that end of the lever remote from its pivotal connection to the first named section, a link pivotally connected to one of the side walls of the lever-like section, said link having a longitudinally extending slot with an off-set at the end remote from the pivotal connection of the lever to the link, and a stud on said second named rim section extending into said slot.

3. A tire rim split at one point, the rim being trough-shaped in cross section, a lever-like member pivoted to one section of the rim at its extremity and pivoted intermediate its ends to the other section of the rim, means for locking the lever-like member in a position with the rim sections in off-set relation comprising a link pivotally connected to the lever-like member and having a longitudinally extending slot with an off-set at the end remote from the pivotal connection of the lever to the link, and a stud on the second named rim section extending into said slot.

In testimony whereof I hereunto affix my signature.

JOHN H. BOWLES.